UNITED STATES PATENT OFFICE.

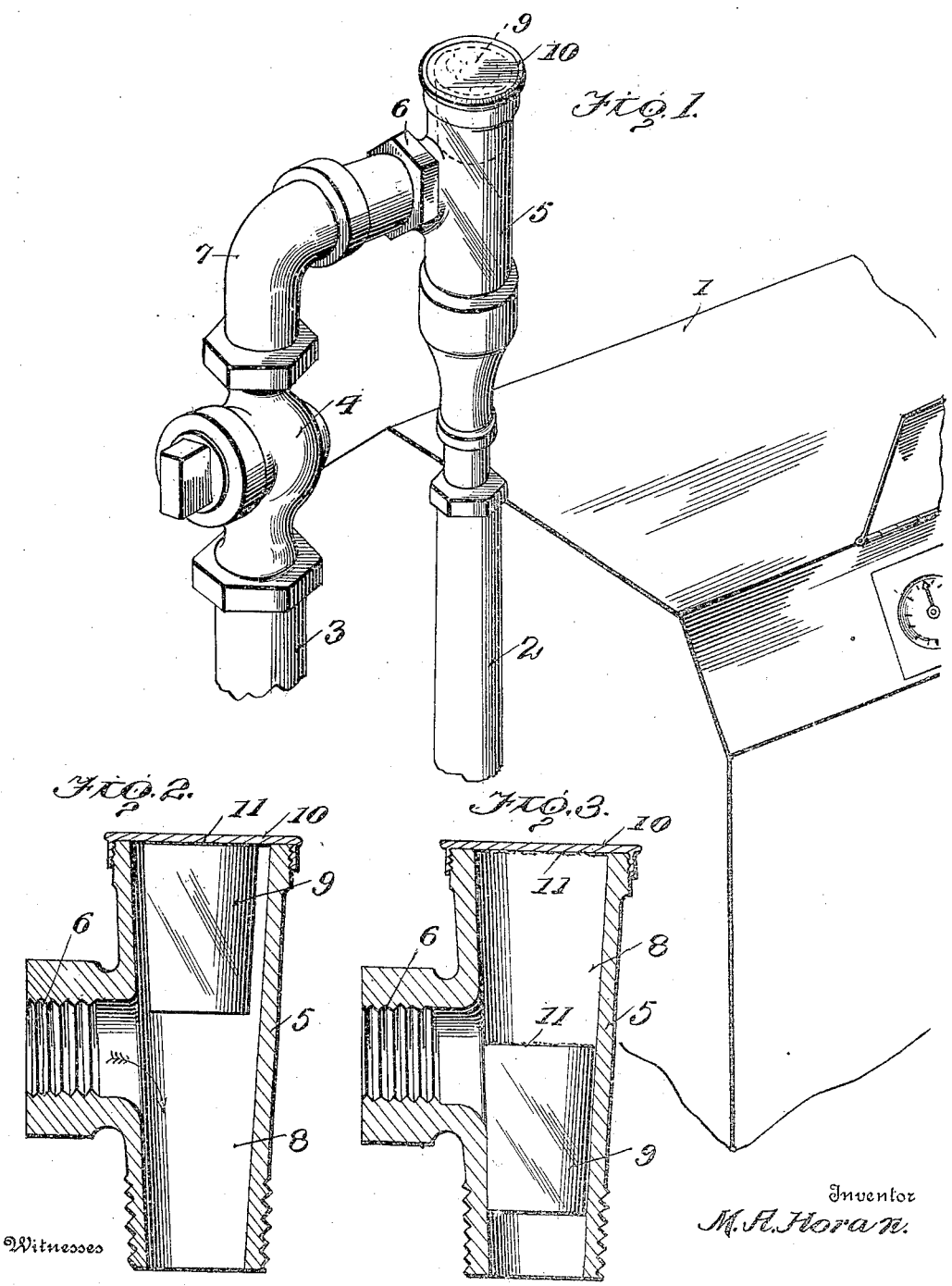

MICHAEL A. HORAN, OF TRENTON, NEW JERSEY.

EMERGENCY CUT-OFF FOR GAS-PIPES.

958,126. Specification of Letters Patent. Patented May 17, 1910.

Application filed February 8, 1909. Serial No. 476,719.

*To all whom it may concern:*

Be it known that I, MICHAEL A. HORAN, citizen of the United States, residing at Trenton, in the county of Mercer and State of New Jersey, have invented certain new and useful Improvements in Emergency Cut-Offs for Gas-Pipes, of which the following is a specification.

This invention relates to cut offs for pipes and is more particularly designed for use in connection with gas pipes, the object being to provide simple and efficient means for automatically cutting off the supply of gas from the service pipe to the meter thereby preventing an explosion of the latter when exposed to fire.

A further object of the invention is to prevent the flow of gas from the service pipe and the ignition thereof which invariably accompanies the bursting of meters and the burning off of the connections.

The invention essentially comprises a section of pipe constituting a valve intermediate the service pipe and the inlet pipe of the meter, and provided with a stopper or plug suspended within the valve by fusible material which upon the approach of fire is melted, thereby permitting the stopper to fall and close the pipe to prevent the flow of gas to the meter.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of the improved cut off or valve in its applied position; Fig. 2 is a vertical sectional view illustrating the open position of the cut off; and, Fig. 3 is a similar view illustrating the closed position thereof.

Corresponding and like parts are referred to in the following description and indicated in all the views of the drawings by the same reference characters.

Referring to the drawings and more particularly to Fig. 1, the improved cut off or valve is illustrated in connection with an ordinary gas meter 1, having an inlet pipe 2 at one side and extended slightly above the top, and a service or supply pipe 3 from which the gas is received. This supply pipe is provided with the usual cock 4 for regulating and controlling the flow of gas therefrom and with the common arrangement and location of said pipe, occupies a position near the inlet pipe 2 of the meter.

The automatic cut off or valve 5 embodying the invention is secured to the inlet pipe 2 and in vertical alinement therewith, and is provided with a side port 6 to which a pipe 7 or elbow leading from the cock 4 is connected. Essentially the cut off 5 preferably comprises a section of pipe provided with a slightly tapered bore 8, and having its larger end extended a sufficient distance past the port 6 to accommodate a stopper or plug 9 suspended therein and in such manner as not to interfere with the flow of gas through the cut off. This stopper or plug is adapted to fit the lower portion of the cut off below the port 6 and forms a closure by which the flow of gas from the service pipe 3 is not permitted to enter the inlet pipe 2 of the meter. The upper end of the cut off is provided with a threaded cap 10, and the plug 9 as shown in Fig. 2 is secured to the inner face of said cap by a thin layer or film of fusible material 11.

With the arrangement of the several parts as shown the operation is as follows: Normally the stopper or plug 9 is retained in the upper or larger portion of the cut off 5 by a thin layer or film of fusible material interposed between the end of the plug and cap 10. In this position the unrestricted flow of gas from the service pipe 3 to the meter 1 is permitted as regulated by the manipulation of the cock 4 and as indicated by the direction of the arrows in Fig. 2. In the event of fire reaching the immediate vicinity of the meter so as to imperil its safety, the heat provided thereby would quickly melt the fusible material 11 by which the stopper is held suspended, and thus released said stopper or plug, would fall to the lower portion of the cut off, past the port 6 and prevent further passage of gas from the service pipe 3 to the meter.

From the foregoing description in connection with the accompanying drawings it will be seen that a simple, cheaply constructed and efficient emergency device for cutting off the gas supply from the service pipe to the meter is provided, which may be applied to any and all character of gas meters now in operation or ready for use without additional parts or structural changes therein, and which owing to its construction may be located at any point intermediate the service pipe and meter to properly protect the latter from explosion and to prevent the unrestricted flow of gas from the service pipe occasioned by such explosion.

Having thus described the invention what is claimed as new is:

1. A cut-off for gas pipes, including a vertical valve chamber having a bore continuously tapered from its upper end to its lower extremity, said chamber having an inlet opening at one side and an outlet opening at the upper end of said chamber normally a downwardly tapering plug valve having an extended upper surface supported within the upper end of said chamber normally above the inlet opening in the said chamber, the plug valve being of such size that when the upper end of the plug valve is below the inlet opening, said valve shall fill the bore of the chamber, closing off the outlet therefrom but permitting the entrance of gas from the inlet opening into the upper portion of the chamber above the plug valve, and a fusible connection between said extended surface and the upper end of the valve chamber, whereby the valve may be released at a predetermined temperature and allowed to drop downwardly into the lower end of the chamber, filling the bore of the same below the inlet opening.

2. A vertical valve chamber having a continuously downwardly and inwardly tapered bore, and an inlet opening at one side of the valve chamber, mid-way between the upper end of the chamber and its lower open end, a covering plate for closing the upper end of the chamber having a marginal screw threaded flange engaging in said chamber, a continuously tapered plug valve supported by a fusible connection on the bottom of the covering plate and normally above the inlet opening in the side of the casing, said plug valve being of such size relative to the casing that when it is supported it is spaced on all sides from the walls of the chamber but when it closes the outlet opening of the chamber the upper face shall be below the inlet opening.

In testimony whereof I affix my signature in presence of two witnesses.

MICHAEL A. HORAN. [L. S.]

Witnesses:
JOHN J. CONSTANT,
FRANK J. RICHARDSON.